US010860825B2

(12) United States Patent
Larson et al.

(10) Patent No.: US 10,860,825 B2
(45) Date of Patent: Dec. 8, 2020

(54) SMART SIGN FOR USE IN AN INDUSTRIAL LOCATION

(71) Applicant: Marking Services Incorporated, Milwaukee, WI (US)

(72) Inventors: Christopher John Larson, Franklin, WI (US); Jeff Keith Dickinson, River Hills, WI (US)

(73) Assignee: MARKING SERVICES INCORPORATED, Milwaukee, WI (US)

( * ) Notice: Subject to any disclaimer, the term of this patent is extended or adjusted under 35 U.S.C. 154(b) by 125 days.

(21) Appl. No.: 16/158,691

(22) Filed: Oct. 12, 2018

(65) Prior Publication Data
US 2020/0117869 A1 Apr. 16, 2020

(51) Int. Cl.
G06K 7/14 (2006.01)
H04W 4/80 (2018.01)
H04W 12/06 (2009.01)
G06K 7/10 (2006.01)

(52) U.S. Cl.
CPC ............ *G06K 7/1404* (2013.01); *H04W 4/80* (2018.02); *H04W 12/06* (2013.01); *G06K 2007/10524* (2013.01)

(58) Field of Classification Search
CPC .................. H04W 4/80; H04W 12/06; G06K 2007/10524; G06K 2017/0093; G06K 7/1404
See application file for complete search history.

(56) References Cited

U.S. PATENT DOCUMENTS

| 8,594,004 | B2* | 11/2013 | Huang | G06K 7/0008 370/310.2 |
| 9,467,799 | B2* | 10/2016 | Kim | H04W 12/06 |
| 9,613,233 | B1* | 4/2017 | Landon | G06Q 10/20 |
| 9,792,542 | B2* | 10/2017 | Curtis | G02B 27/017 |
| 9,858,452 | B2* | 1/2018 | Butler | H04L 67/1097 |
| 2003/0225707 | A1* | 12/2003 | Ehrman | G06Q 10/08 705/64 |

(Continued)

FOREIGN PATENT DOCUMENTS

WO 2016186790 A1 11/2016

OTHER PUBLICATIONS

International Search Report and Written Opinion for Application No. PCT/US2019/053384 dated Jan. 7, 2020 (16 pages).

*Primary Examiner* — Thomas D Alunkal
(74) *Attorney, Agent, or Firm* — Michael Best & Friedrich LLP

(57) ABSTRACT

A smart parent sign is provided for assisting in performing an interactive procedure utilizing assets that include asset identifiers in an industrial facility. The smart parent sign includes information for a parent asset and for a group of child assets with child tags disposed nearby. The smart parent sign includes an electronic processor having a memory, a transceiver, a parent asset identifier; and a power manager. The electronic processor is configured to provide data from the memory corresponding to at least one of the child assets that corresponds to one of the child tags to a portable smart device. The electronic processor is also configured to provide procedures for the parent and child assets to the portable smart device.

19 Claims, 17 Drawing Sheets

(56) References Cited

U.S. PATENT DOCUMENTS

| | | | |
|---|---|---|---|
| 2007/0176750 A1* | 8/2007 | Sakai | G06Q 10/08 340/10.4 |
| 2009/0171786 A1* | 7/2009 | Kuo | G06Q 30/02 705/14.73 |
| 2015/0302650 A1* | 10/2015 | Abdelmoati | G06F 3/0488 345/633 |
| 2015/0353236 A1* | 12/2015 | Gentile | G06Q 10/087 235/375 |
| 2018/0048710 A1* | 2/2018 | Altin | H04L 67/12 |

* cited by examiner

FIG. 14

SMART SIGN FOR USE IN AN INDUSTRIAL LOCATION

BACKGROUND

The present invention relates to a method for performing an interactive procedure for assets by providing a smart parent sign that includes a localized database inclusive of asset information for a parent asset corresponding to the smart parent sign and for additional child assets. The smart parent sign communicates with a portable smart device that does not have an internet connection to execute interactive maintenance, clearance, testing, and operation procedures (hereafter "MCTO procedures") in an industrial facility.

Internet connections within an industrial facility are not considered desirable or practical for controlling assets by some operators. There also is an issue of hacking of the connections to assets and asset information by competitors or others.

SUMMARY

By providing local wireless communication between a portable smart device and a smart parent sign corresponding to a parent asset and child assets, hacking of the assets of the industrial facility is prevented.

There are many assets in an industrial facility. Thus, providing a smart parent sign or smart parent tag for each asset is not desirable or practical. Instead, providing a smart parent sign that corresponds to a parent asset and a plurality of additional assets offers a solution. By not maintaining a cellular connection, security risk is avoided.

In one embodiment, a smart parent sign for assisting in performing an interactive procedure utilizing assets that include asset identifiers in an industrial facility is provided to include information for a parent asset and for a group of child assets disposed nearby and corresponding to child tags. The smart parent sign includes an electronic processor having a memory, a transceiver, an asset identifier, and a power manager. The electronic processor is configured to provide data from the memory corresponding to at least one of the child assets that corresponds to one of the child tags to a portable smart device.

Another embodiment provides a method of performing a procedure with a portable smart device, in combination with a smart parent sign and child tags for assets in an industrial facility. The method includes actuating the portable smart device to open a procedure application, providing credentials from the portable smart device to the smart parent sign, wherein the smart parent sign identifies the portable smart device, providing a directory having at least one procedure from the smart parent sign to the portable smart device for display thereon, selecting one of the procedures by a user of the portable smart device, downloading the selected procedure onto the portable smart device, the procedure including indicia and photographs, and executing the procedure without or internet access.

In another embodiment, a smart sign system comprises a plurality of child tags for a group of child assets, the child tags having an asset identifier, and a smart parent sign for assisting in asset management or performing an interactive procedure utilizing assets that include asset identifiers in an industrial facility. The smart parent sign includes information for a parent asset and for the plurality of child assets disposed nearby and corresponding to the child tags. The smart parent sign and the corresponding child tags are disposed so that a portable smart device is configurable to communicate with the smart parent sign to obtain information for at least one of the child assets.

Other aspects of the invention will become apparent by consideration of the detailed description and accompanying drawings.

BRIEF DESCRIPTION OF THE DRAWINGS

FIG. 14 shows a window of a graphical user interface for a list of forms for an asset.

DETAILED DESCRIPTION

Before any embodiments are explained in detail, it is to be understood that the embodiments are not limited in application to the details of construction and the arrangement of components set forth in the following description or illustrated in the following drawings. Other embodiments are capable of being practiced or of being carried out in various ways.

Figure 1:
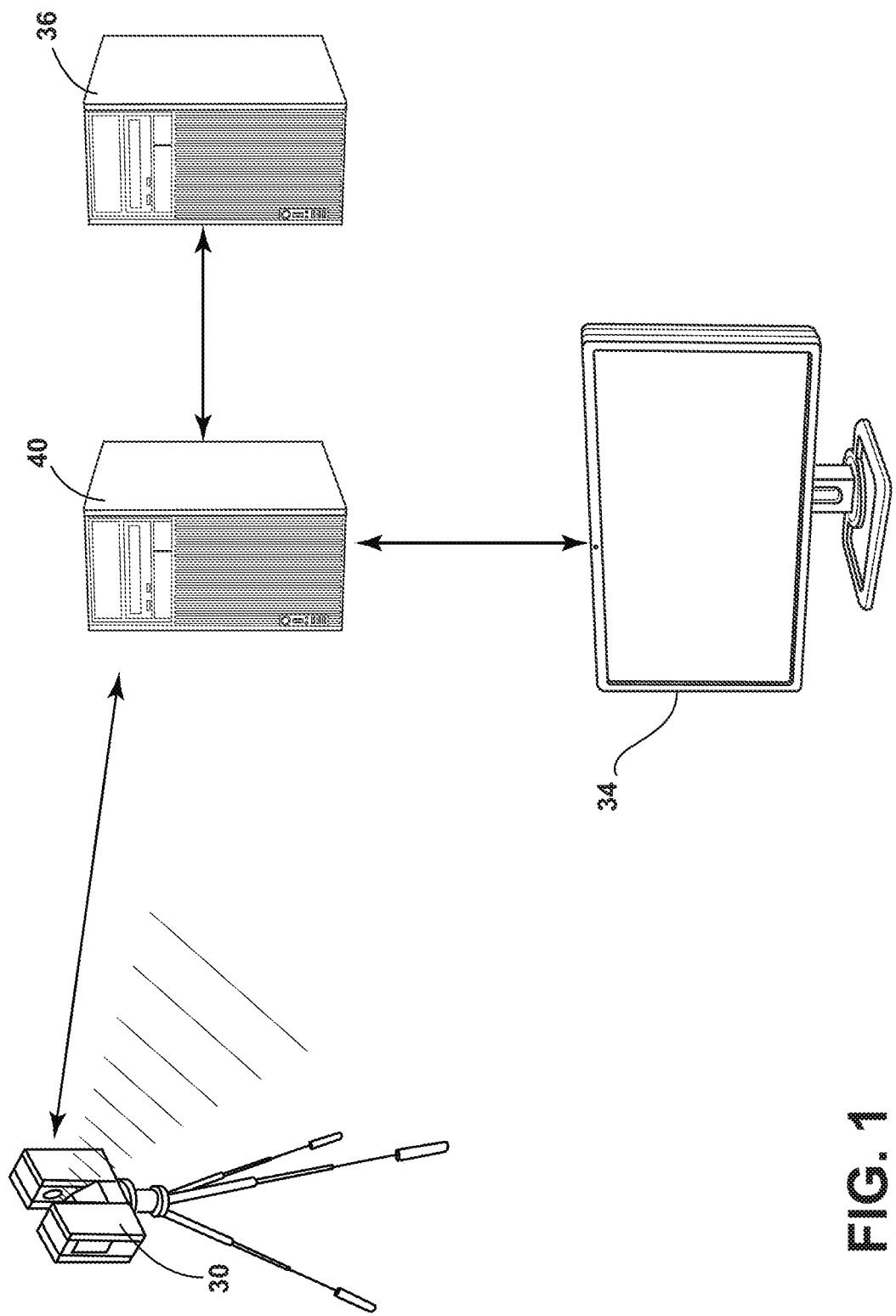
FIG. 1 shows a diagram of a system for obtaining a piping and instrumentation diagram of an industrial facility.

FIG. 1 shows a three dimensional (3-D) laser scanner 30 for laser scanning of piping and other equipment in an industrial facility to obtain a piping and instrumentation (P&ID) diagram. The laser scanner 30 is a known device, such as a light detection and ranging device (LiDAR) that uses one or more lasers and cameras to measure and capture environments in three dimensions (3-D). The laser scanner 30 projects a laser beam and for every surface that the laser beam hits, a point in space is recorded (xyz). At the same time, the laser scanner 30 will also record the reflectivity of the surface giving an intensity value, and may include cameras which sense color and thus provide a red/green/blue (RGB) color value to each point. These points are captured at speeds of up to at least 1 million points of data per second, creating a very dense point cloud of data. The scanning is performed at different locations and in different directions that are stored. Accordingly, besides the point cloud, the location and orientation of the laser scanner 30 is provided.

FIG. 1 also shows an administrative user interface 34 and a memory database 36 in communication with a local computer 40. In one embodiment, the memory database 36 includes terabytes of data. In other embodiments, greater amounts of data storage are contemplated for mapping or otherwise obtaining a piping and instrumentation (P&ID) diagram for an industrial facility having a piping installation with piping and equipment. The arrangement of FIG. 1 is disclosed in U.S. Pat. No. 9,613,233 (the '233 patent), based on U.S. application Ser. No. 15/231,260 filed Aug. 8, 2016, the disclosure of which is hereby incorporated by reference, in its entirety.

An operator utilizes stored point cloud data to create an accurate P&ID diagram and/or a user creates a P&ID diagram with a computer aided design (CAD) program. The user may use the registered data images to maneuver around piping, valves, and equipment to validate the created existing P&ID diagram as disclosed in the '233 patent.

Identification and Labeling of Equipment

Figure 2:
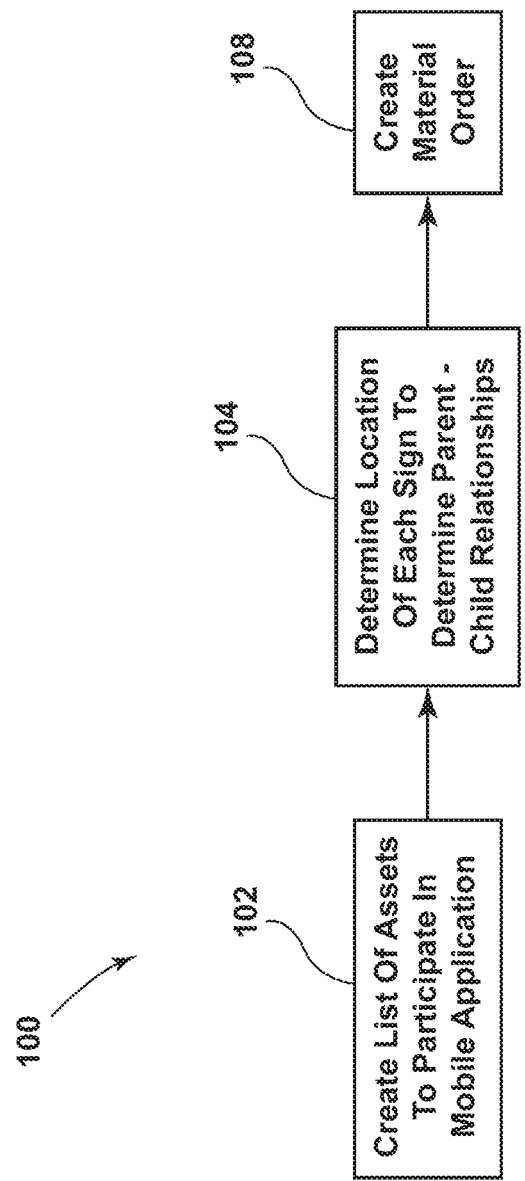
FIG. 2 is a flow chart for creating material orders for smart signs and child signs.

FIG. 2 shows a flowchart of an algorithm or other program 100 that is executable by the local computer 40 to provide unique identification (for example, using labels or quick response (QR) codes) of specific assets, such as valves and other equipment for the validated P&ID diagram. First, a line list of assets is created, obtained, or updated (step 102) from client provided P&ID diagrams describing various assets thereof. Thereafter, the list is digitally pre-tagged with the assets defined as parent signs or child signs (step 104). The program advances and an order or sequence for mounting of the signs, tags or labels for the assets is determined (step 108). In creating an order, a specific sequence for providing specific tags and labels to the assets is determined. In one embodiment, the sequence includes pictures of the asset to be tagged. The labeling information is stored in the memory database 36 by the local computer 40.

Besides, the above information, windows that include indicia and/or photographs, along with other information, is provided for view states for installing signs or tags on the assets of the validated P&ID diagram. Indicia include icons, menus, scroll bars, buttons pull-down menus, wizards, buttons, selectors, photographs, video and text shown on a display. An order or sequence for mounting of the signs, labels and the tags is determined and stored in the memory database 36.

Meanwhile, unique signs, labels, stickers, tags with QR codes or bar codes, radio frequency identification (RFID) tags and other physical identifiers are prepared for the various assets disposed at various locations in the industrial facility to provide warnings and information to a user. More specifically, warning signs and informational labels are created for the piping, valves, and other assets and for mounting at locations corresponding to the locations of those assets in the industrial facility.

Asset Information Management Platform

Figure 3:
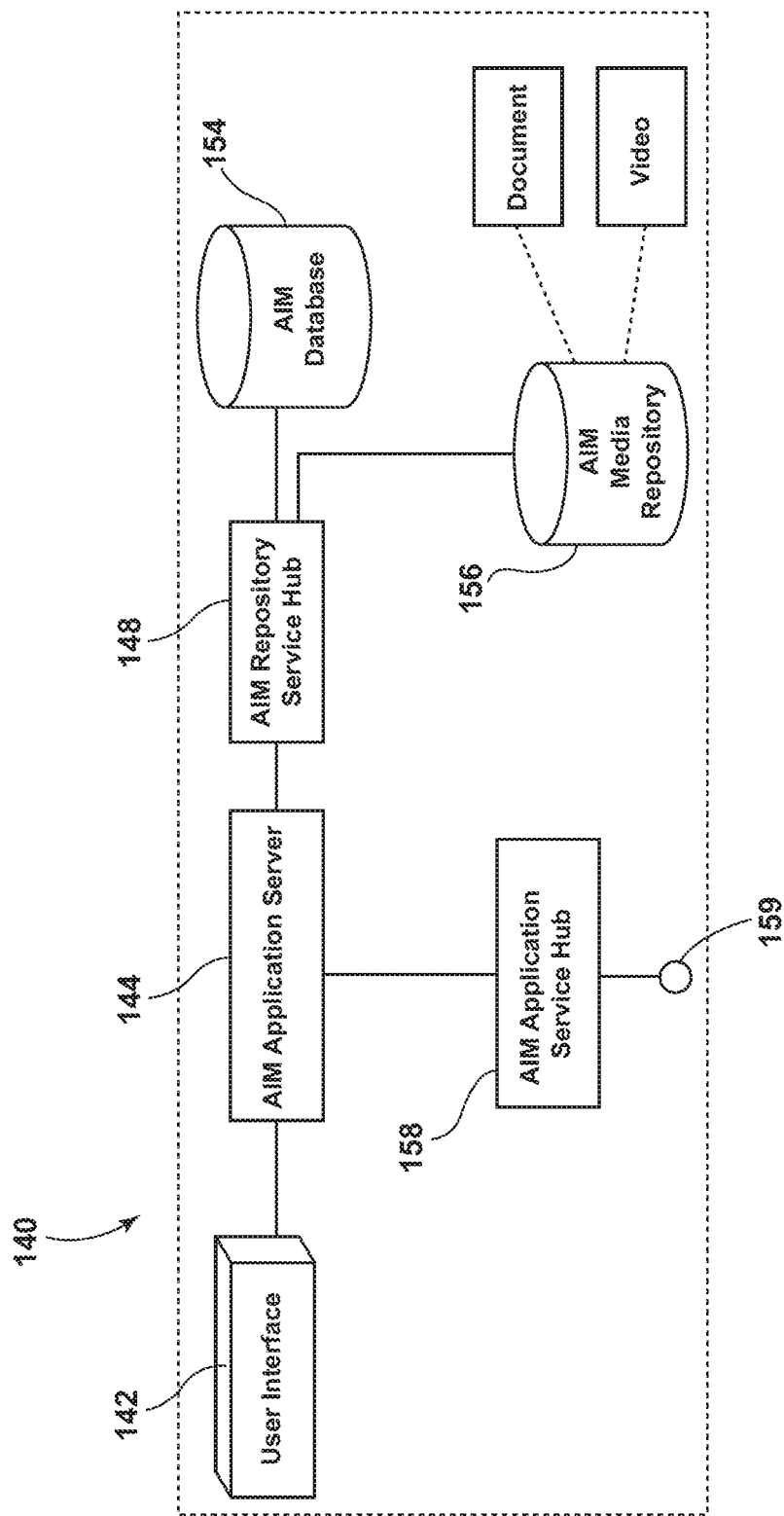
FIG. 3 is architecture diagram of an asset information management application platform.

The asset information management (AIM) application platform 140 shown in FIG. 3 includes an AIM user interface 142 and an AIM application server 144. The AIM application platform 140 includes an AIM repository service hub 148. The AIM repository service hub 148 shown in FIG. 6 links the AIM application server 144 to each of an AIM database 154 and an AIM media repository 156. An AIM application service hub 158 shown in FIG. 6 connects to the AIM application server 144 and includes an asset data provider 159 for two-way communication with other devices. The AIM application service hub 158 also enables synchronization with other devices. The AIM application platform 140 is discussed in detail in U.S. application Ser. No. 15/231,260 filed Aug. 8, 2016, the disclosure of which is hereby incorporated by reference in its entirety.

The AIM application server 144 hosts a graphical user interface containing multiple pages. The AIM user interface 142 allows an administrator to control the settings of the AIM application server 144 and to receive associated asset media for specified facilities for storage by the AIM application platform 140. In one embodiment, the AIM application platform 140 is a cloud based arrangement. In another embodiment, the AIM application platform 140 is an application platform used to capture and manage all asset related information for multiple purposes including MCTOs, training, reference, etc.

The AIM media repository 156 securely manages video, photographs, images, and document content. The AIM media repository 156 is also scalable based on the needs of the AIM application platform 140. Further detail regarding the AIM application platform is set forth in U.S. application Ser. No. 15/231,260, which is incorporated by reference in its entirety.

Client Application Interactive Procedure and Asset Management System

Figure 4:
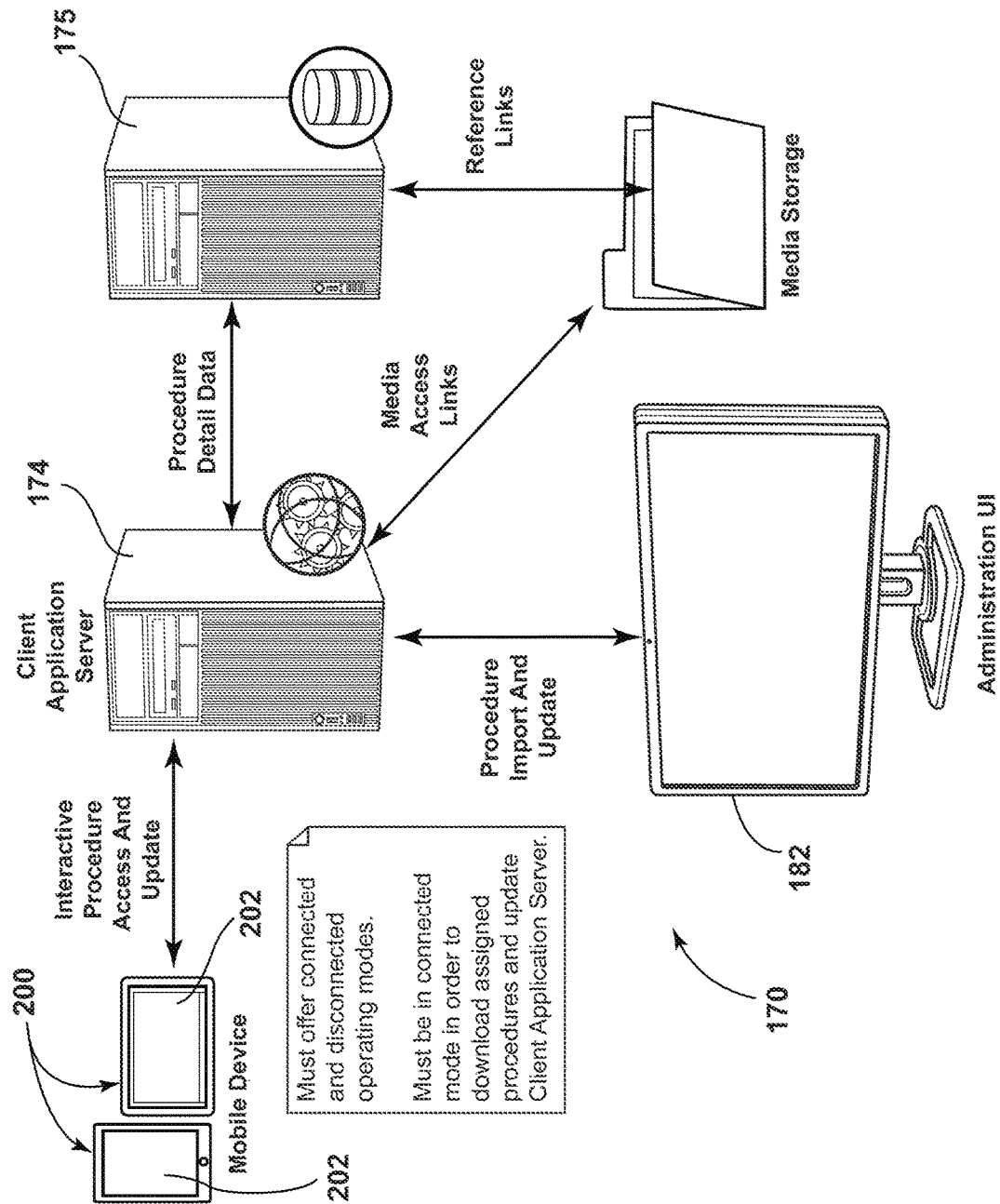
FIG. 4 is a client application interactive procedure and asset management system.

FIG. 4 shows a client application interactive procedure and asset management system 170 that includes a client application server 174. An asset information management server 175 or other memory device provides databases as shown including media storage. FIG. 4 shows a client administration user interface 182 and a client portable smart device 200 having a display and a camera (not shown). The asset information management server 175, the client administration user interface 182 and the portable smart device 200 are all provided in communication with the client application server 174. In one embodiment, each portable smart device 200 is a tablet computer having a touch screen 202. The touch screen 202 provides a display and receives inputs from a user. In one embodiment, the asset information management server 175 communicates when the portable smart device 200 is within range for communication by one of a group consisting of Bluetooth, Zigbee near-field, wireless Ultrawideband communication, and other arrangements. In other embodiments, a physical connection is provided between the asset information management server 175 and the portable smart device 200 with a connecting cable or other arrangement.

Portable Smart Device

Figure 5:
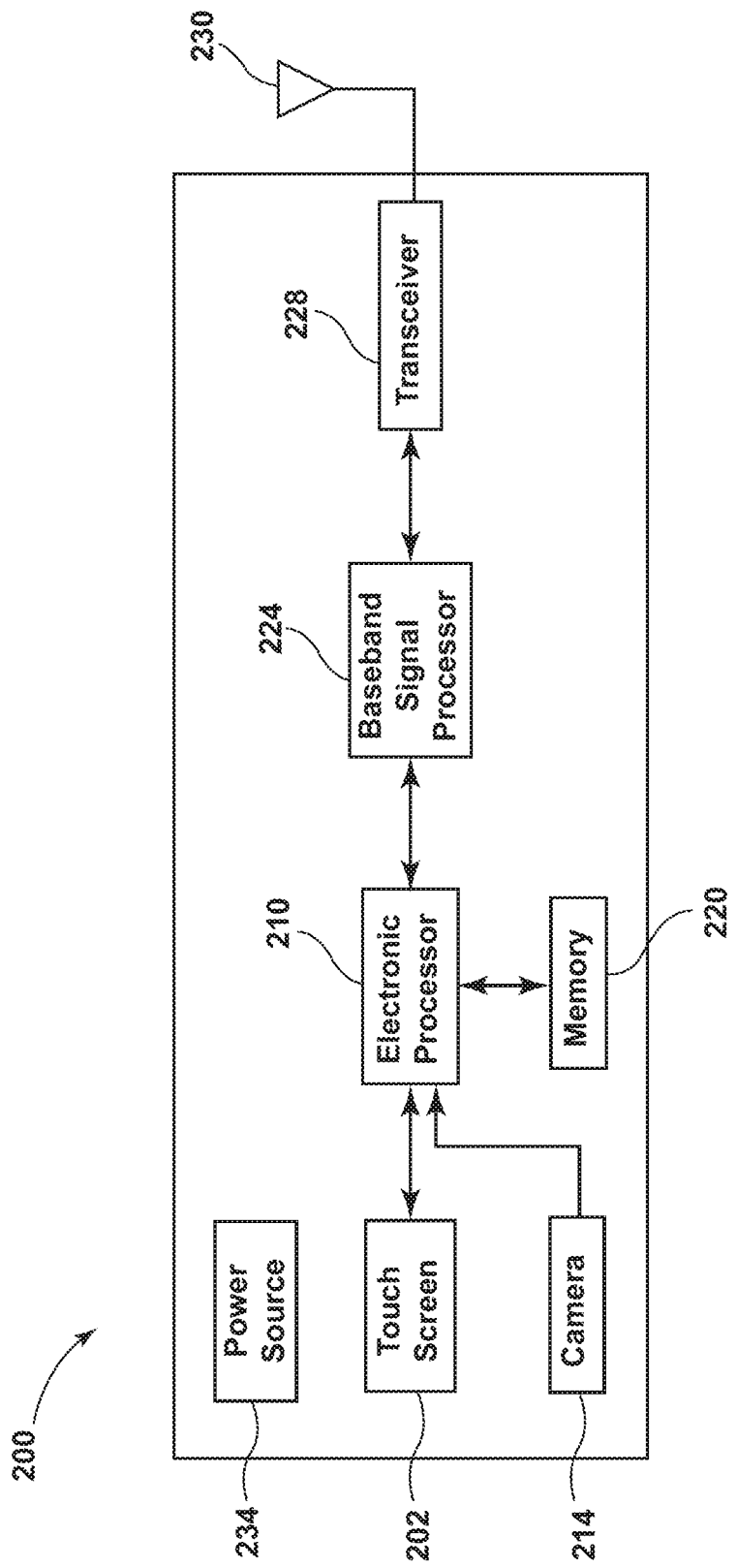
FIG. 5 is a block diagram of a portable smart device.

FIG. 5 shows a block diagram of the portable smart device 200 that includes an electronic processor 210 that receives inputs from the touch screen 202 and from a camera 214. The portable smart device 200 includes a memory 220 for providing and storing information, along with instructions for the electronic processor 210. The portable smart device 200 includes a baseband signal processor 224, a transceiver 228 and an antenna 230 for near field wireless communication. In some embodiments, the transceiver 228 is provided from a group consisting of: a Bluetooth transceiver, a Zigbee transceiver, a near-field communication transceiver, a wireless Ultrawideband transceiver, and other arrangements.

The portable smart device 200 includes a power source 234 for powering the components thereof. In one embodiment, the power source 234 includes a rechargeable cell or cells for powering the electronic processor 210 or the like.

The electronic processor 210 shown in FIG. 5 can be a signal processor, a microcontroller, an Application-specific integrated circuit ("ASIC") or the like. The memory 220 can be a flash memory, an EPROM, a magnetic memory, an optical device, or other memory. The memory 220 can include a volatile memory, non-volatile memory, including a random access memory ("RAM") and a read-only memory ("ROM"). The portable smart device 200 can include an interface that could be developed in the form of hardware and/or software. In a hardware design, the interfaces can be part of a system ASIC, which encompasses a wide variety of functions of the device. However, it is also possible that the interfaces are discrete, integrated switching circuits or are at least partly made up of discrete components. In a software design, the interfaces can be software modules, which are provided on a microcontroller in addition to other software modules, for instance.

The camera 214 of the portable smart device 200 is capable of scanning images and obtaining photographs. The camera 214 includes an auto-focus for automatically focusing on an image when a photograph is obtained. The camera 214 typically is a digital camera that is capable of optical scanning and video recording. In one embodiment, the transceiver 228 acts as a radio frequency identification (RFID) reader.

In one embodiment, the client application interactive procedure and asset management system 170 includes a client procedure service hub that connects the client application server 174 to a procedure template database, a client subscription database, a procedure activity database, and the portable smart device 200.

In one example, a procedure administration portal is a secure web-based application that permits the input of client or MCTO procedures. All client information, including asset subscription data, is maintained in the client subscription database, which adds control and scalability to the client application interactive procedure and asset management system 170.

Smart Parent Sign

Figure 6:
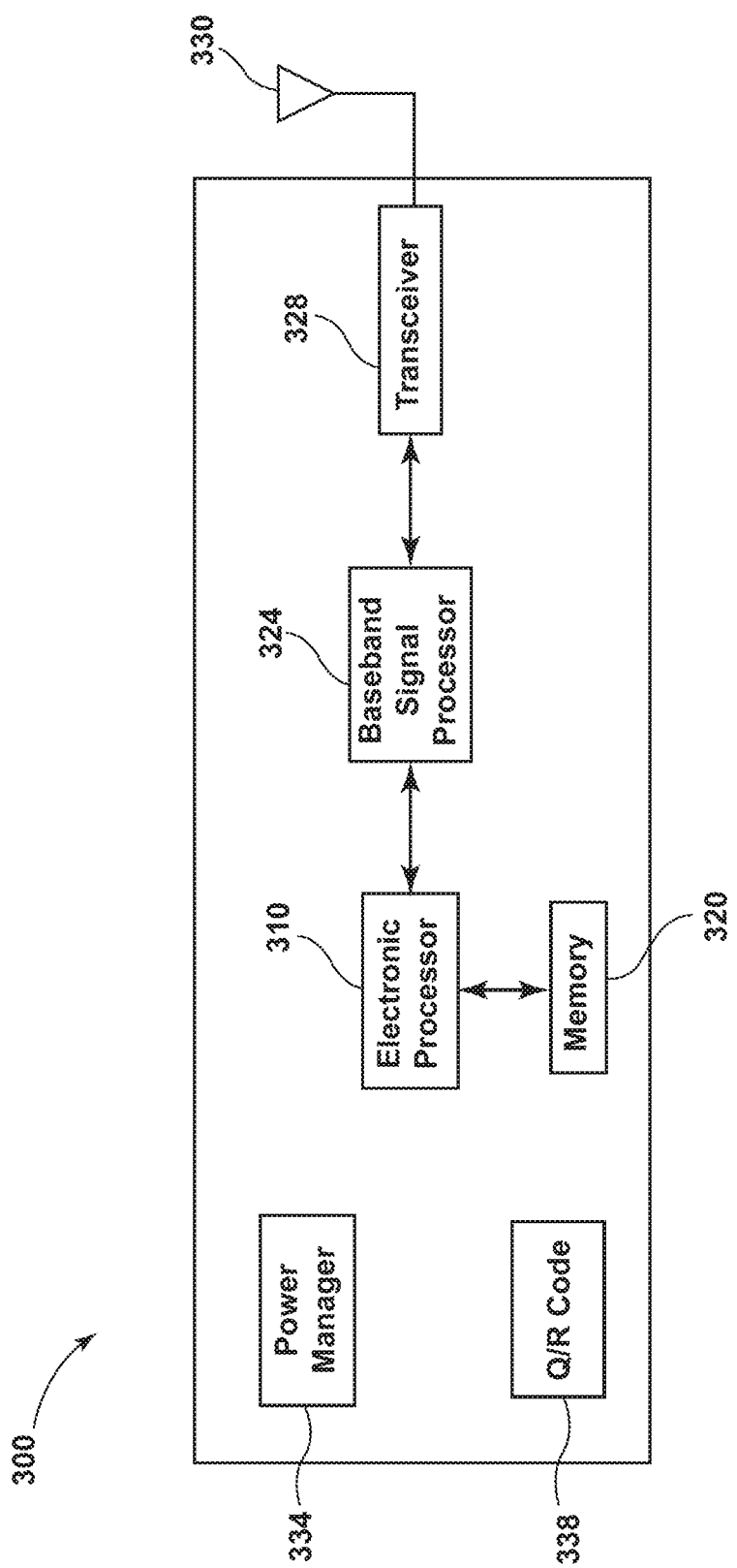
FIG. 6 is a block diagram of a smart parent sign.

FIG. 6 is a block diagram of a parent smart sign 300 that includes an electronic processor 310 and a memory 320 for providing and storing information, along with instructions for the electronic processor 310. The parent smart sign 300 includes a baseband signal processor 324, a transceiver 328 and an antenna 330 for near field wireless communication. The parent smart sign 300 includes a power manager 334 having at least one solar cell in one embodiment for receiving sunlight and at least partially recharging a rechargeable cell or cells for powering the electronic processor 310 and the other components. Further, the parent smart sign 300 includes an asset identifier 338, for instance a machine readable code, such as a Q/R code, 2D code, 3D bar code or Radio-frequency identification (RFID) code, that identifies the specific unique parent smart sign provided therewith.

The electronic processor 310 shown in FIG. 6 can be a signal processor, a microcontroller, an Application-specific integrated circuit ("ASIC") or the like. The memory 320 can include a volatile memory, non-volatile memory, including a random access memory ("RAM") and/or a read-only memory ("ROM"). The stored data is information for the assets corresponding to the child tags and also instructions for execution of various procedures, such as a maintenance procedure, a clearance procedure, a testing procedure and an operating procedure for an industrial facility that includes piping and equipment.

The parent smart sign 300 has a substrate supporting the components shown in FIG. 6. The electronic processor 310 and memory 320 are embedded in the parent sign in one embodiment. Further, in one embodiment, the parent smart sign 300 includes an adhesive and an adhesive cover, wherein upon removal of the adhesive cover, the parent smart sign is secured to piping, equipment or the like. In another embodiment, the parent smart sign 300 is a tag or a tag structure that is attachable to a valve or other device with an attachment element.

Figure 7:
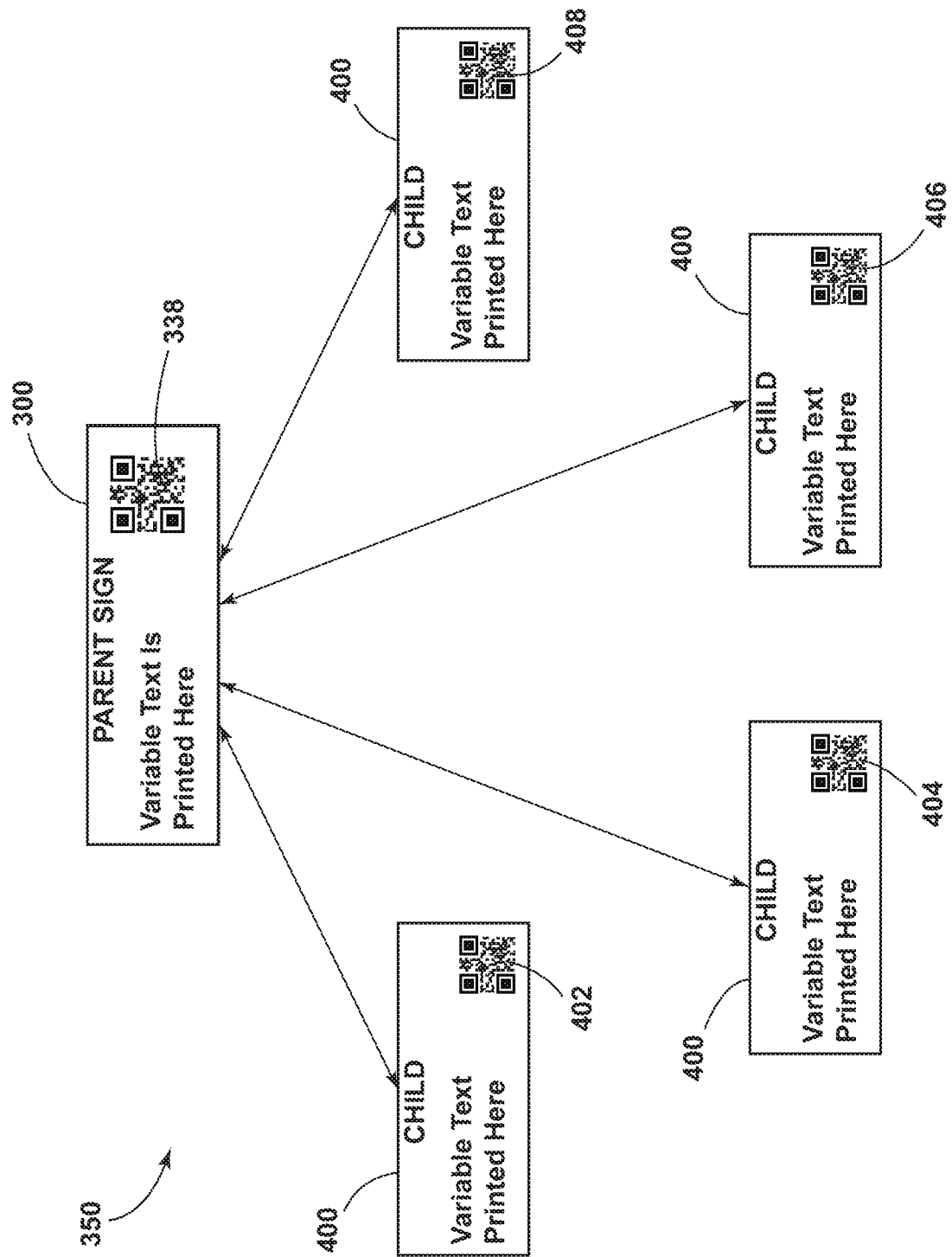
FIG. 7 is a view of a combination of a smart parent sign and child tags.

FIG. 7 shows a smart sign system 350 for an installation that includes a parent smart sign 300 having an asset identifier 338 and a plurality of child tags 400 each having a unique asset identifier 402, 404, 406, 408. In some embodiments, the asset identifiers for the child tags are one or more from a group consisting of a Q/R, 2D, 3D bar code or RFID that identifies the specific unique child tag 400 associated therewith. The parent smart sign 300 and the child tags 400 include text related to the asset associated therewith, which is labeled as variable printed text in FIG. 7. Examples of printed text in one embodiment are "GLY-PMP-1," "ICE CREAM MACHINE1," AND "GLYCOL SUPPLY PUMP."

Figure 8:
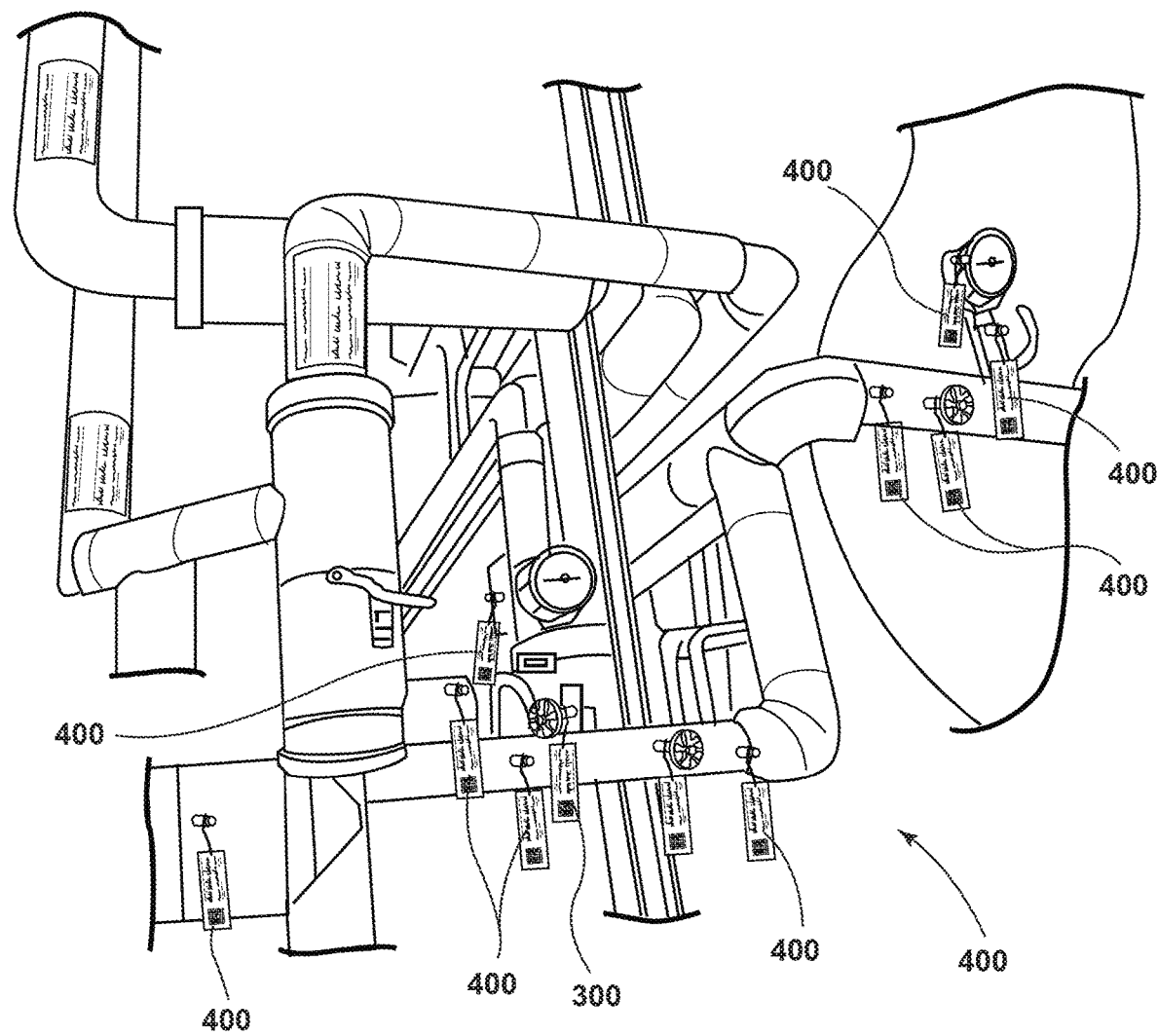
FIG. 8 is a perspective view of piping and instrumentation for a portion of an industrial facility having a parent sign.

FIG. 8 shows piping and instrumentation 440 for a portion of an industrial facility having a smart parent sign 300. Further, a plurality of child tags 400 having an asset identifier are provided on various additional components. The smart parent sign 300 is in the form of a tag attached to a valve in this embodiment. While the smart parent sign 300 looks similar to the child tags 400, the smart parent sign includes an electronic processor 310, memory 320, transceiver 328, a power manager 334, and other components as shown in FIG. 6.

Information Updates to Smart Sign

Figure 9:
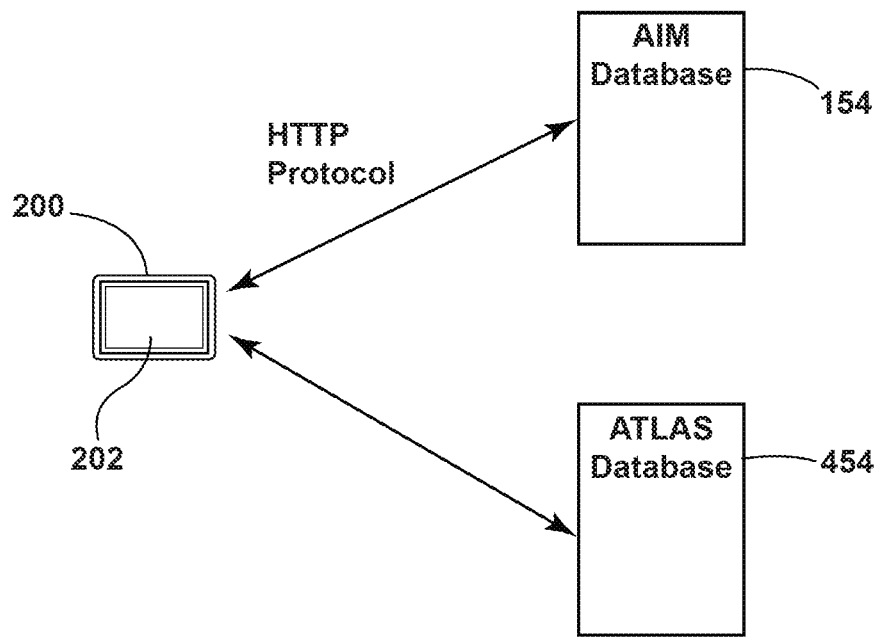
FIG. 9 is a block diagram illustrating communication of a portable smart device with databases.
Figure 10:
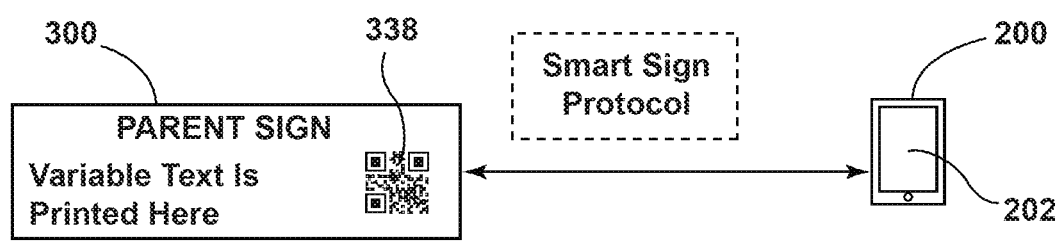
FIG. 10 is a block diagram illustrating communication of a portable smart device with a smart parent sign.

FIG. 9 shows a portable smart device 200 provided in communication with the AIM database to obtain updates for parent and child information stored on a smart sign 300. For instance, if an asset is removed and thus deleted from the AIM database 154 or replaced with a new asset, the portable smart device 200 stores the information. When the portable smart device 200 is disposed near the smart parent sign 300 as shown in FIG. 10, the information is provided to the electronic processor 310 of the smart parent sign to delete the information for the removed asset from the memory 320 of the smart parent sign. When a new asset or a replacement asset is provided, the information for the replacement asset is updated into the memory of the smart parent sign 300.

Likewise, information on procedures is stored in the ATLAS database 454 shown in FIG. 9. When information for a given procedure has changed, the updates are provided to the portable smart device 200. Thereafter, the portable smart device 200 provides the information or changes for a given procedure to the electronic processor 310 for storage in the memory 320 of the smart parent sign 300. A smart sign protocol is used to communicate between the transceiver 228 and components of the portable smart device 200 and the transceiver 328 and components of the smart parent sign 300.

Operation of Smart Sign with Portable Smart Device

Figure 11:
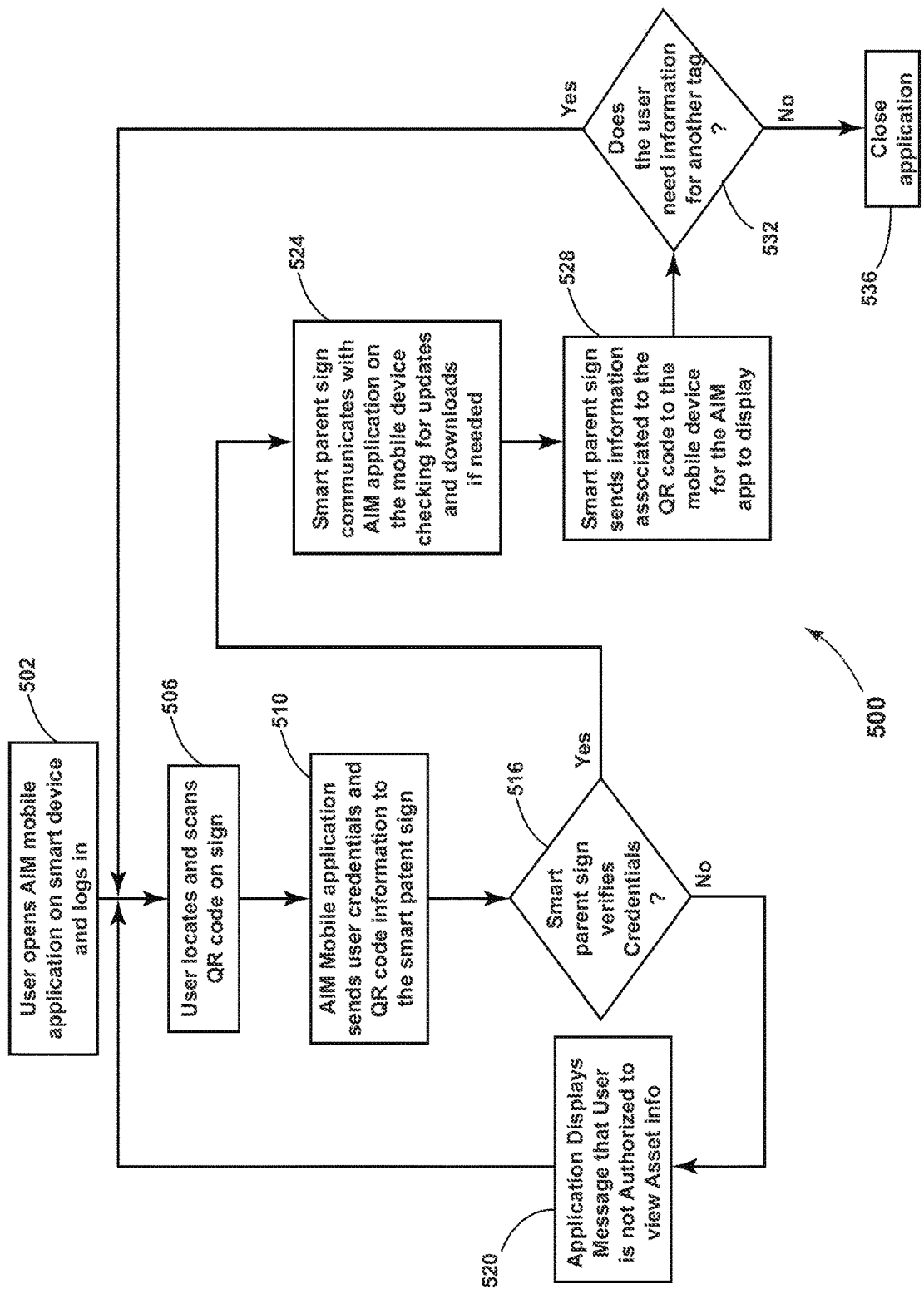
FIG. 11 is a flow chart for use of the smart parent sign to identify assets.
Figure 12:
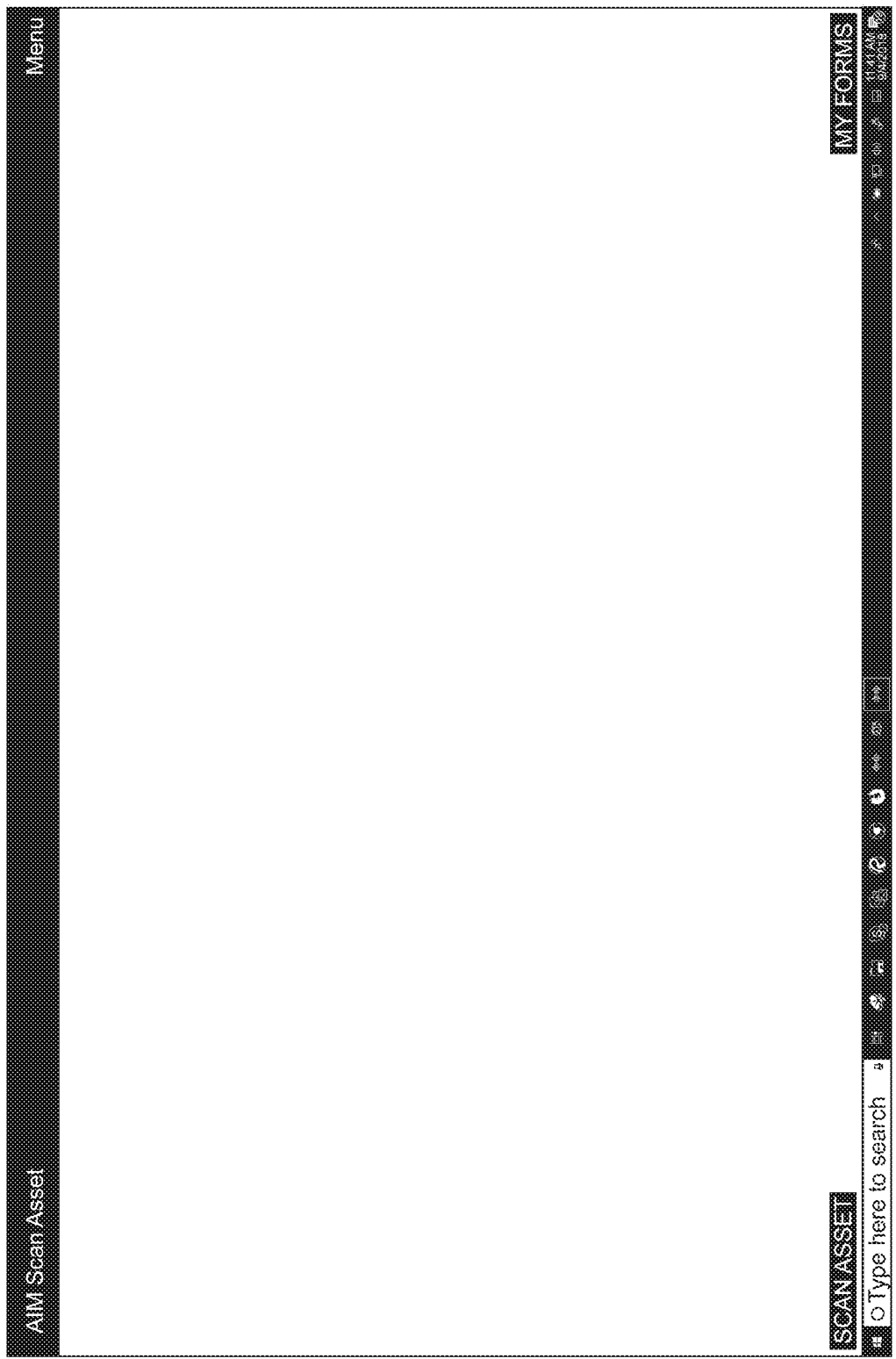
FIG. 12 shows an initial graphical user interface for a portable smart device.
Figure 13:
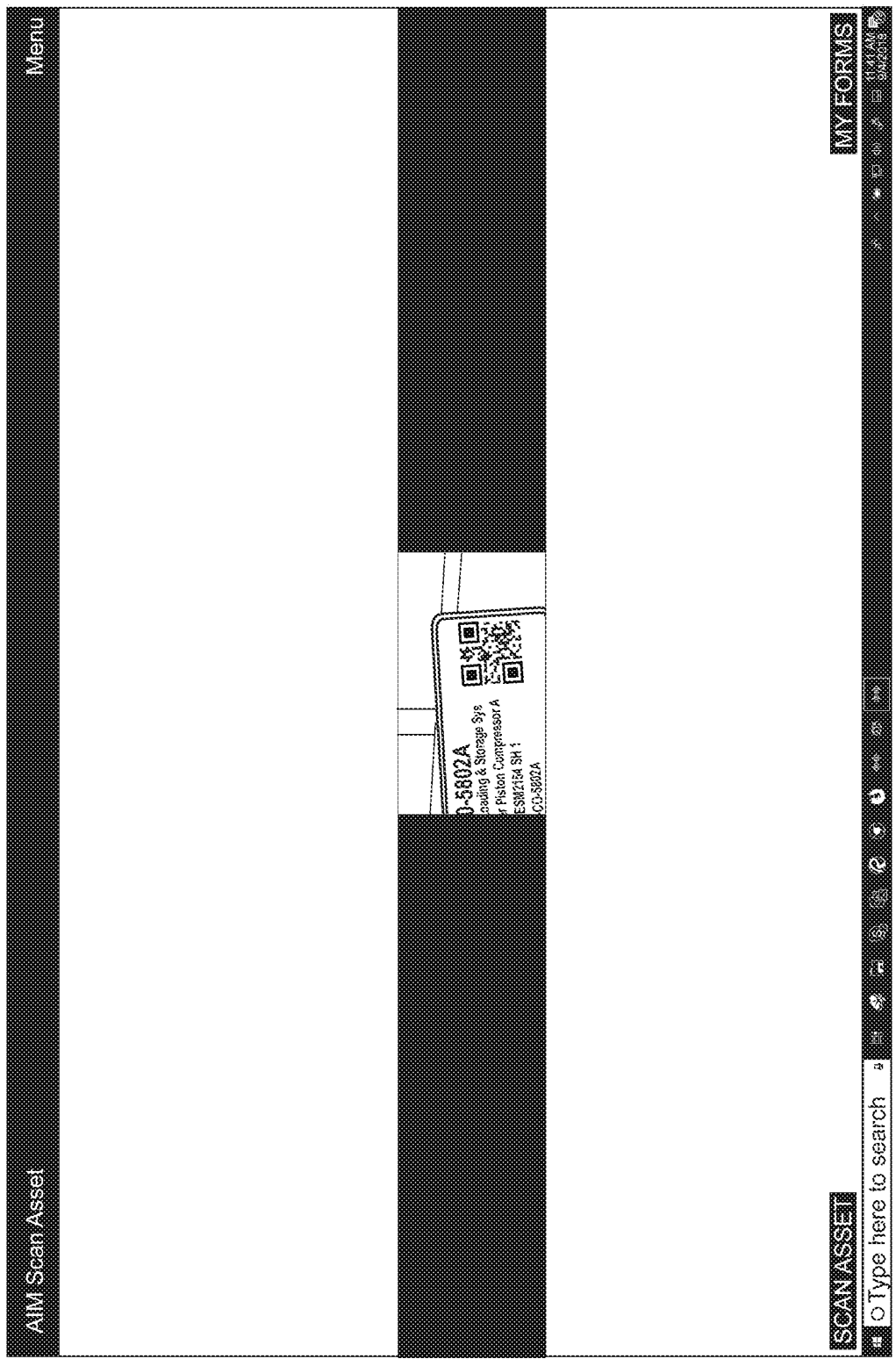
FIG. 13 shows a window of a graphical user interface for scanning a sign or tag.

FIG. 11 shows a flow chart 500 of operation of the smart parent sign 300 with the portable smart device 200. A user operates the portable smart device 200 using the touch screen 202 to open an AIM mobile application and logs in (step 502). After login, the touch screen 202 of the portable smart device 200 appears as shown in the graphical user interface (GUI) 503 shown in FIG. 12. FIG. 12 shows a scan asset icon at the lower left and a forms icon at the lower right of the GUI 503. Thereafter, a user selects the scan asset icon and locates and scans the asset identifier 338 of the smart parent sign 300 with the camera 214 (step 506). In another embodiment, the scanned asset identifier is a scanned smart parent sign or a child tag, providing information identifying the smart parent sign or the corresponding child tag. FIG. 13 is a GUI 507 of the touch screen 202 of the portable smart device 200 scanning a child tag. The portable smart device 200 sends user credentials and the asset identifier information to the smart parent sign 300 (step 510). The electronic processor 310 of the smart parent sign 300 determines whether the credentials are valid (decision step 516). When the credentials are not good or valid (decision step 516), the electronic processor 310 provides a return signal to the touch screen 202 of the portable smart device 200 indicating that the user is not authorized to utilize the smart parent sign 300 (step 520). Thereafter, the user is prompted to again attempt to scan another asset identifier (step 506).

Figure 14:
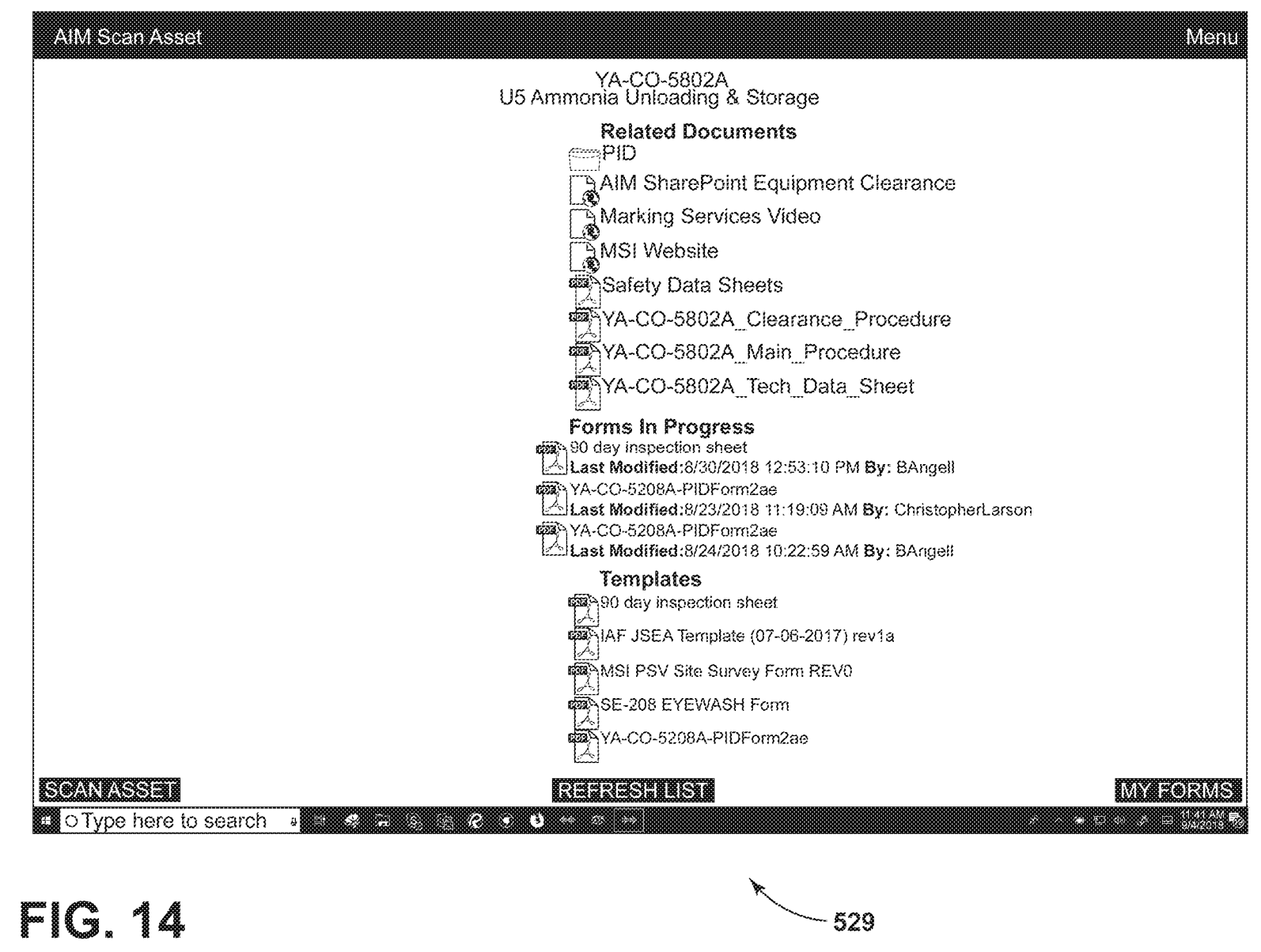

When the credentials are verified as valid (decision step 516), the electronic processor 310 of the smart parent sign 300 links or connects to the portable smart device 200 and checks for updates or downloads for the database stored thereon (step 524). The updates can be child tag data or information for any of the child tags 400 associated with the particular smart parent sign. After the updates are downloaded to the portable smart device 200, the electronic processor 310 provides information associated with the asset identifier that was scanned to the portable smart device (step 528) for display on the touch screen 202. FIG. 14 is a GUI 529 of a list displayed on the touch screen 202 corresponding to one of the child tags 400. The electronic processor 310 of the smart parent sign then asks, or in another embodiment, the electronic processor 210 of the portable smart device 200 asks the user on the touch screen 202, whether the user needs to scan another tag 400 for information (step 532). If not the application is closed on the portable smart device (step 536). Of course, a user may select an item displayed on the list shown in FIG. 14. A menu is provided at the top right of the GUIs 503, 507, 529 for selection by the user.

In the event that the user needs information for another child tag 400, the user selects the scan asset on the lower left of the touch screen 202 and the portable smart device 200 returns to user locating and scanning another asset identifier (step 506).

In an instance, wherein the scanned asset identifier is for a child tag 400, the portable smart device 200 and the smart parent sign 300 operate in a similar manner. The smart parent sign 300 determines whether the credentials of the portable smart device 200 are valid, and if so, provides information associated with the asset corresponding to the unique child tag 400 to the portable smart device 200 for display on the touch screen 202.

Downloading a Procedure

Figure 15:
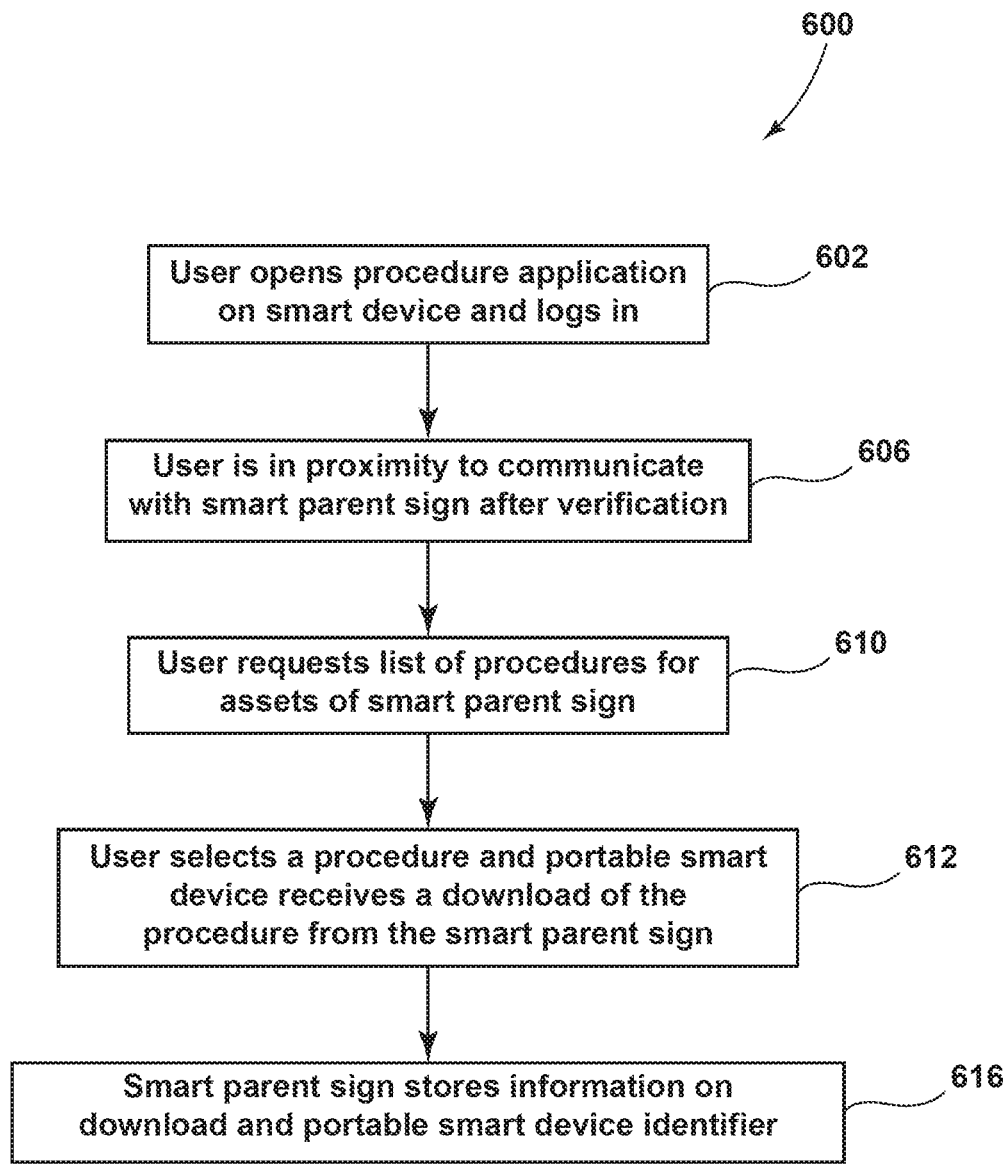
FIG. 15 shows a flow chart for loading of an interactive procedure from a smart parent sign.

FIG. 15 shows a flow chart 600 illustrating the loading of an interactive procedure from a smart parent sign 300 to a portable smart device 200. First, a user opens a procedure application on the portable smart device 200 and logs in using authentication credentials, such as a password to gain access to the portable smart device 200 (step 602). When the user is within proximity to communicate with a smart parent sign 300, the portable smart device 200 sends credentials that are verified by the smart parent sign to enable communication therebetween (step 606).

The user operates the portable smart device 200 to select or request a list of procedures from the smart parent sign 300 for the smart parent sign asset and child assets thereof for display on the touch screen 202 (step 610). From the list, the user makes a selection of a procedure to be performed and the portable smart device 200 receives the procedure from the smart parent sign 300 (step 612). In the GUI shown in FIG. 14, a user selects a Clearance Procedure or a Main Procedure from the list shown for downloading the procedure from the smart parent sign 300.

A progress indication is provided on the touch screen 202, showing a percentage of completion, along with a completed indication when the download to the portable smart device 200 is complete.

The smart parent sign 300 at least temporarily stores information as to which procedure was downloaded and also stores a portable smart device identifier for identifying the portable smart device 200 that received the downloaded procedure (step 616). In one embodiment, the most recent five downloaded procedures and corresponding smart device identifiers are stored. In another embodiment, ten downloaded procedures and corresponding smart device identifiers are stored. In one embodiment, the time/date stamp of the download is also stored.

Executing a Procedure

Upon receiving a downloaded procedure, a user of the portable smart device is able to execute the interactive procedure in a similar manner as disclosed in FIG. 12 of U.S. Pat. No. 9,613,233, which is incorporated by reference. A user receives steps with corresponding photographs and text. The user must scan the asset identifiers on the child tag or parent tag for the asset to determine matches and open/close respective valves, button, and switches, as required. More specifically, a user scans a first asset identifier for a first asset. Upon performing a step of a procedure and optionally taking a picture and/or providing notes, the user confirms execution of the first procedural step. Indicia and a photograph are provided on the touch screen 202 of the portable smart device 200 for a second procedural step. The user scans a second asset identifier of the second asset. The scanned asset identifier matches the second procedural step. The user performs that second procedural step. The user actuates a selector shown on a touch screen 202 of the portable smart device 200 as an input that confirms execution of the second procedural step. Then, indicia and a photograph are provided on the display or touch screen 202 of the portable smart device 200 for a third procedural step to be performed. The user performs third and/or multiple out of sequence procedure steps to perform an interactive procedure. In some embodiments, the portable smart device 200 is configured to allow an operator to enter notes or comments for each procedural step.

The portable smart device 200 determines if the interactive procedure is complete (that is all the steps in an MCTO procedure have been performed and confirmed). If the procedure is not complete, another asset is displayed on the touch screen 202 for scanning a QR code with the camera 214 of the portable smart device 200.

When the interactive procedure is complete, the portable smart device 200 generates a report that identifies the operator, time/date stamp, and date of the procedure, and includes any notes and/or photographs obtained by the operator. Thus, the report documents the execution of the procedure. Thereafter, a user can go to the same or another smart parent sign 300 and select and download another second interactive procedure. The previously downloaded procedure is written over by the second procedure. Then the user can execute another procedure. Another report can be generated.

In one embodiment, the portable smart device 200 submits the report(s) at the end of a work shift or upon completion of the procedure when the portable smart device is in communication with the client application interactive procedure and asset management system 170. The portable smart device 200 communicates or synchronizes with the client application interactive procedure and asset management system 170 when the portable smart device is within range for communication, such as in a control room or locker room of the industrial facility. The actions completed and information, such as a procedure completion or result and a date stamp for completed procedures are obtained and loaded in the procedure activity database 180. In this manner, the procedure is performed without the use of the internet and the portable smart device 200 does not have to store a plurality of programs thereon.

$2^{ND}$ User Issue

In an instance wherein a second user approaches a smart parent sign 300 and obtains a list or a directory of procedures, and attempts to download a procedure that was downloaded earlier by another user, a warning is provided by the smart parent sign 300. The warning identifies that the desired interactive procedure was downloaded at an identified earlier time by an identified earlier user. Thus, the second user can determine whether the earlier user is performing the procedure. Besides providing a warning of performing the same procedure, in other instances where a different procedure is provided using some of the same or related assets, a warning or indication is provided that another user has downloaded a procedure that is using at least some of the same assets for the desired procedure. Thus, a second user with another portable smart device is informed of a checkout of the procedure by a first user and that a first user may performing an interactive procedure utilizing a group of child assets that the second user is intending to utilize. The time of the checkout by the first user can be provided to the second user.

Figure 16:
FIG. 16 shows a window of a graphical user interface for an interactive inspection checklist.

FIG. 16 shows a portion of a graphical user interface 650 of an accumulation area inspection checklist for display on the touch screen 202 that is selected from the list of Templates at the bottom center shown in the GUI 529 of FIG. 14. Various required fields are shown where information including dates and names must be entered to complete the inspection checklist.

Figure 17:
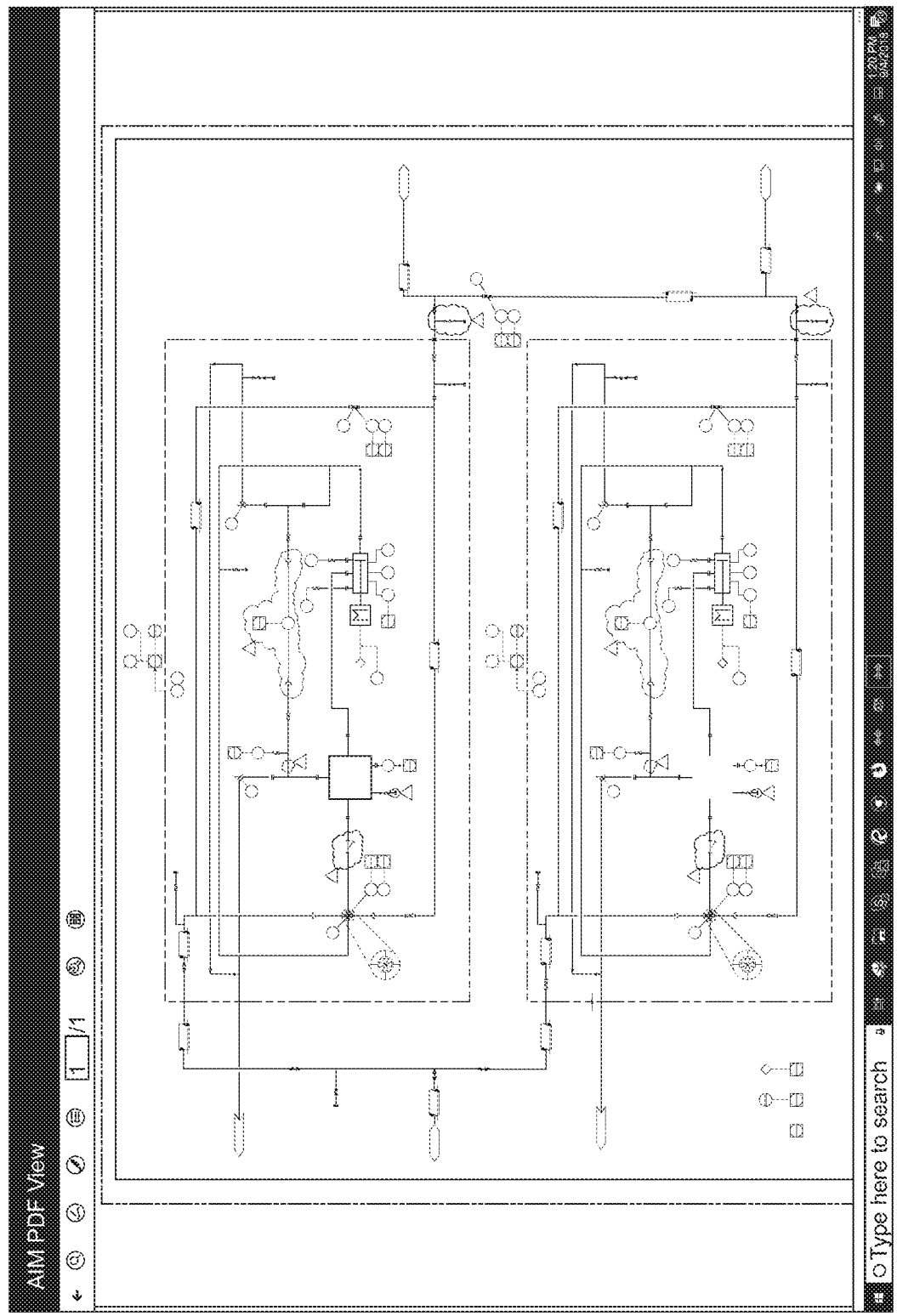
FIG. 17 shows a window of a graphical user interface for a piping and instrumentation diagram.

FIG. 17 shows a piping and instrumentation diagram (PID) provided as a graphical user interface 660 displayed on the touch screen 202 of the portable smart device 200. The PID corresponds to the top icon illustrated in the GUI 529 shown in FIG. 14. The GUI 660 corresponds to at least a portion of an industrial facility that includes one or more assets provided with a smart parent sign.

Figure 18:
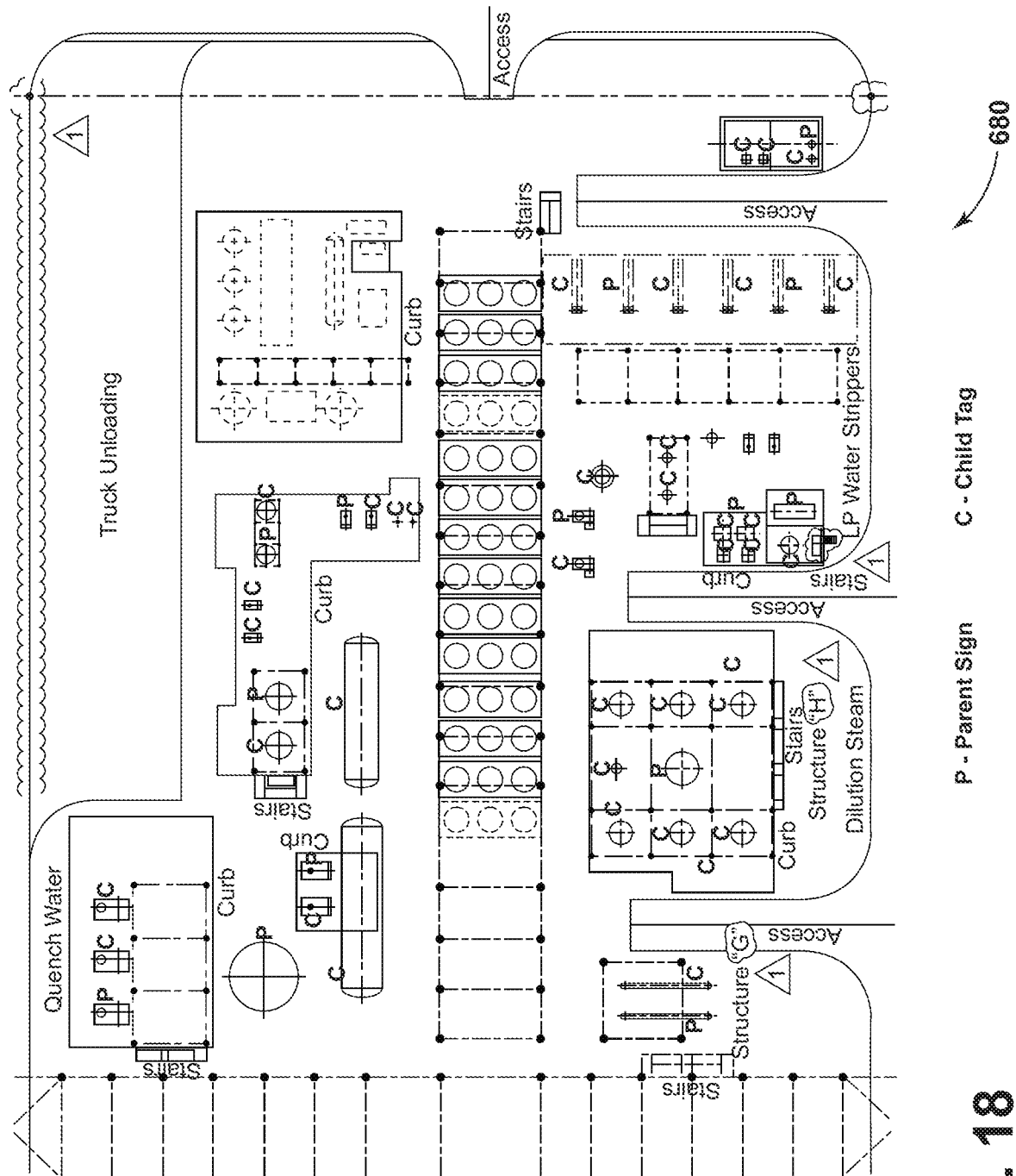
FIG. 18 shows a diagram of an industrial facility with parent signs and child tags.

FIG. 18 shows a map 680 of an industrial facility showing how parent signs P and child tags C are provided and located in the facility. The plurality of child assets C are disposed nearby a corresponding parent sign P as shown in FIG. 18. In some embodiments, the map is stored in the smart parent sign 300 for downloading to the portable smart device 200 and display thereon.

While the portable smart device 200 shown in FIG. 5 includes a touch screen 202, in other embodiments, the portable smart device includes a keypad and a separate display screen.

In some embodiments, the procedures for a smart parent sign asset and associated child assets include steps that require the use of assets that are not child assets, and thus are outside of the asset family.

Thus, the invention provides, among other things, an arrangement for storing information about assets and procedures locally so that a user can obtain information and procedures without use of a wireless internet connection that is capable of being sensed by equipment located outside of an industrial facility. Various features and advantages of the invention are set forth in the following claims.

What is claimed is:

1. A smart parent sign for assisting in performing an interactive procedure utilizing assets that include asset identifiers in an industrial facility, the smart parent sign being provided with information for a parent asset and for a group of child assets disposed nearby and corresponding to child tags, the smart parent sign comprising:
    an electronic processor having a memory;
    a transceiver;
    an asset identifier; and
    a power manager,
    wherein the electronic processor is configured to:
        in response to receiving credentials from a portable smart device, identify the portable smart device,
        provide a directory of procedures stored in the memory to the portable smart device,
        upon receiving an input from the portable smart device to select a procedure, download the selected procedure to the portable smart device, the procedure including procedural steps that include a location of a first asset having a first asset identifier, and an image that includes the first asset,
    wherein the portable smart device is configured to perform the procedure without internet access.

2. The smart parent sign according to claim 1, wherein the asset identifier of the smart parent sign is a Q/R code.

3. The smart parent sign according to claim 1, wherein the child assets include equipment, piping, and valves.

4. The smart parent sign according to claim 1, wherein the electronic processor of the smart parent sign is configured to:
    upon receiving the credentials from the portable smart device, provide information identifying at least one of the smart parent sign and the corresponding child tags.

5. The smart parent sign according to claim 1, wherein the procedure is one from a group consisting of: a maintenance procedure, a clearance procedure, a testing procedure and an operating procedure for an industrial facility that includes piping and equipment, and wherein the photograph that includes the first asset is provided from point cloud data.

6. The smart parent sign according to claim 1, wherein the electronic processor is configured to:
    upon receiving an input from the portable smart device corresponding to a scanned smart parent sign or a child tag, providing information identifying the smart parent sign or the child tag.

7. The smart parent sign according to claim 1, wherein the power manager includes at least one solar cell.

8. The smart parent sign according to claim 1, wherein the smart parent sign includes the information corresponding to the child tags that include a Q/R code secured to the respective child tag.

9. The smart parent sign according to claim 1, wherein the procedure provided from the memory includes data for a plurality of the child assets.

10. The smart parent sign according to claim 1, wherein the smart parent sign is secured to one from a group consisting of equipment, a piping, and a valve.

11. A method of performing a procedure with a portable smart device, in combination with a smart parent sign and child tags for assets in an industrial facility, the method comprising:
    actuating the portable smart device to open a procedure application;
    providing credentials from the portable smart device to the smart parent sign, wherein the smart parent sign identifies the portable smart device;

providing a directory having procedures from the smart parent sign to the portable smart device for display thereon;
selecting one of the procedures by a user of the portable smart device;
downloading the selected procedure onto the portable smart device, the procedure including indicia and photographs; and
executing the procedure without internet access.

12. The method of claim 11, wherein executing the procedure includes a first procedural step of providing indicia and photographs on a display of the portable smart device for a location of a first asset having a first asset identifier, and a photograph that includes the first asset;
upon the portable smart device receiving an input to provide a scan, scanning for the first asset identifier of the first asset, reading the scanned first asset identifier and determining whether the scanned first asset identifier matches the first asset identifier, and
upon the scanned first asset identifier matching the first asset identifier, displaying a second procedural step on the portable smart device for an action by the first asset and displaying a request to confirm that the second procedural step for the first asset is completed.

13. The method according to claim 12, further including:
upon the portable smart device receiving an input that confirms execution of the second procedural step, providing indicia and a photograph on the display of the portable smart device for a third procedural step to be performed.

14. The method according to claim 11, wherein a result and date stamp for loaded procedures are stored in a memory of the portable smart device.

15. The method according to claim 14, wherein the portable smart device is configured to provide the result and the date stamp for completed procedures to an asset information management server when the portable smart device is within range for communication.

16. The method according to claim 12, including:
upon actuating another portable smart device to receive information from the smart parent sign identifying the smart parent sign and the corresponding child tags, and providing information about the procedure downloaded by the portable smart device for the procedure being performed on the industrial facility by a first user, the another portable smart device receives an indication of a checkout of the procedure by the first user.

17. The method according to claim 12, the method further including displaying a percentage of completion of the procedural steps of the procedure, and the confirming that the procedural step is completed includes actuating a selector shown on a touch screen of the display of the portable smart device.

18. A smart sign system for performing a procedure comprising:
a plurality of child tags for a group of child assets, the child tags having an asset identifier,
a smart parent sign for performing an interactive procedure utilizing assets that include asset identifiers in an industrial facility, the smart parent sign being provided to include information for a parent asset and for the plurality of child assets disposed nearby and corresponding to child tags, and
a portable smart device for being disposed by the smart parent sign to communicate with the smart parent sign, wherein the portable smart device is configured to:
provide credentials to the smart parent sign so that the smart parent sign identifies the portable smart device,
receive a directory having procedures from the smart parent sign,
enable a user to select one of the procedures,
download and receive the selected procedure, and
execute the procedure without internet access.

19. The smart sign system according to claim 18, wherein the smart parent sign includes:
an electronic processor having a memory;
a transceiver for communicating with the portable smart device;
an asset identifier; and
a power manager.

* * * * *